US006450529B1

(12) United States Patent
Kalandek et al.

(10) Patent No.: US 6,450,529 B1
(45) Date of Patent: Sep. 17, 2002

(54) INFLATABLE SIDE AIR BAG CURTAIN MODULE WITH CHAMBER SEPARATORS

(75) Inventors: Bruce A. Kalandek, Dearborn; Pongdet P. Wipasuramonton, Rochester; Robert Tobian, New Baltimore, all of MI (US)

(73) Assignee: Breed Automotive Technologies, Inc., Lakeland, FL (US)

( * ) Notice: Subject to any disclaimer, the term of this patent is extended or adjusted under 35 U.S.C. 154(b) by 0 days.

(21) Appl. No.: 09/602,266

(22) Filed: Jun. 23, 2000

(51) Int. Cl.[7] .............................................. B60R 21/22
(52) U.S. Cl. ................................ 280/730.2; 280/743.2
(58) Field of Search ......................... 280/730.2, 730.1, 280/743.2, 743.1, 728.1, 728.2

(56) References Cited

U.S. PATENT DOCUMENTS

| 3,897,961 | A |   | 8/1975  | Leising et al.         |          |
|-----------|---|---|---------|------------------------|----------|
| 5,033,771 | A | * | 7/1991  | Miyauchi et al.        | 280/728.1|
| 5,078,423 | A | * | 1/1992  | Fujita                 | 280/743  |
| 5,464,250 | A | * | 11/1995 | Sato                   | 280/743.1|
| 5,676,395 | A | * | 10/1997 | Oe et al.              | 280/730.2|
| 5,678,858 | A | * | 10/1997 | Nakayama et al.        | 280/743.2|
| 5,788,270 | A | * | 8/1998  | H.Ang.land et al.      | 280/729  |
| 5,884,937 | A | * | 3/1999  | Yamada                 | 280/730.2|
| 5,944,342 | A |   | 8/1999  | White, Jr. et al.      |          |
| 6,010,149 | A | * | 1/2000  | Riedel et al.          | 280/730.2|
| 6,073,961 | A | * | 6/2000  | Bailey et al.          | 280/730.2|
| 6,135,493 | A | * | 10/2000 | Jost et al.            | 280/730.2|
| 6,170,871 | B1| * | 1/2001  | Goestenkors et al.     | 280/743.1|
| 6,199,898 | B1| * | 3/2001  | Masuda et al.          | 280/730.2|
| 6,224,091 | B1|   | 5/2001  | Eyrainer et al.        |          |
| 6,238,438 | B1|   | 5/2001  | Fischer et al.         |          |

FOREIGN PATENT DOCUMENTS

| DE | 296 14 201 U1 | 11/1996 |
| DE | 297 18 305 U1 | 3/1998  |
| WO | WO 98/33682   | 8/1998  |

* cited by examiner

*Primary Examiner*—Brian L. Johnson
*Assistant Examiner*—Faye M. Fleming
(74) *Attorney, Agent, or Firm*—Markell Seitzman

(57) ABSTRACT

A side impact or rollover protection restraint system (20) comprising: an air bag of sufficient length to extend from a first (30) pillar to at least a second pillar (34) of the vehicle, the air bag (22), upon inflation, is of sufficient height to extend from proximate a roof rail (38) of the vehicle to a location generally adjacent the shoulder of a 50th percentile sized seated occupant such that the inflated air bag will lie between the occupant and a side portion of the vehicle; the air bag including a first and a second panel of material that are joined together to create at least one inflatable volume (101*a,b*) and a plurality of internal tethers or separators for forming corresponding bridges between predetermined regions of each of the first and second panel such that upon inflation of the air bag these regions are spaced from one another by an internal tether.

15 Claims, 12 Drawing Sheets

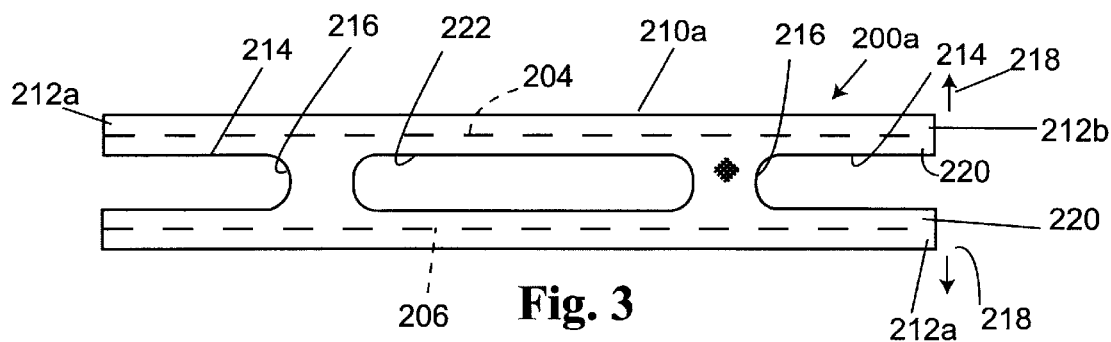
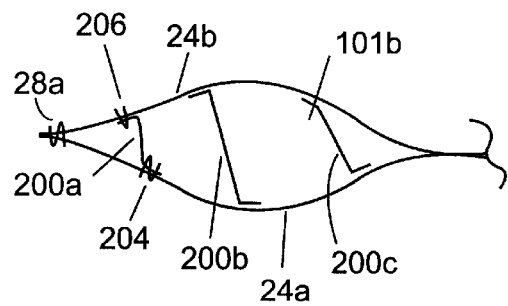
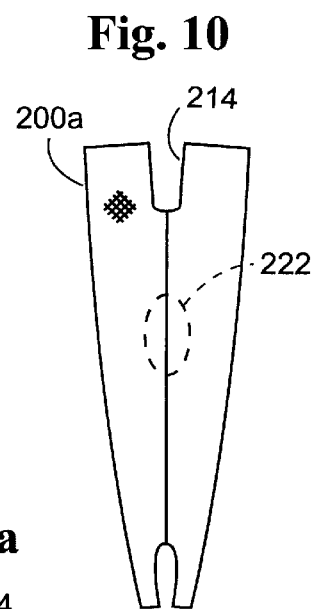
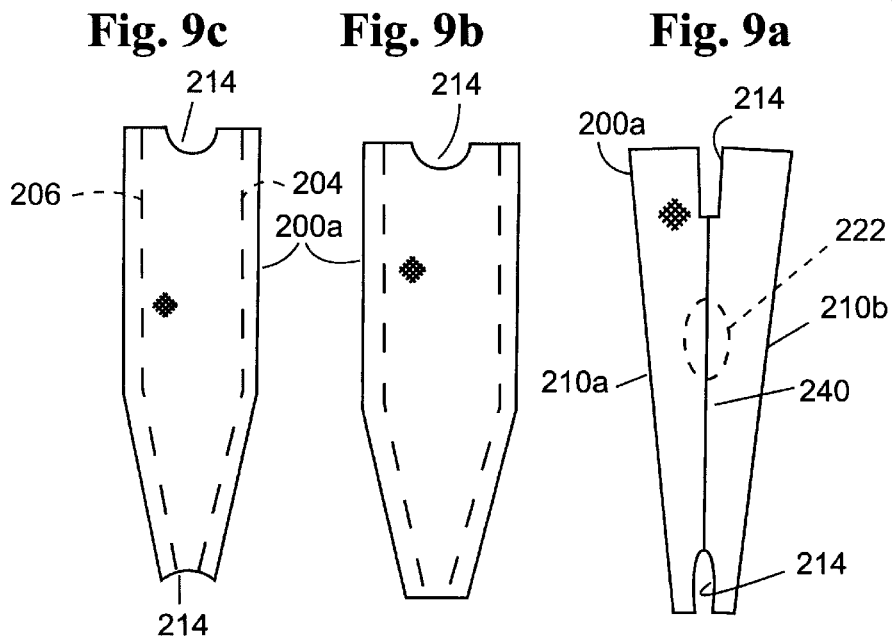

US 6,450,529 B1

INFLATABLE SIDE AIR BAG CURTAIN MODULE WITH CHAMBER SEPARATORS

BACKGROUND AND SUMMARY OF THE INVENTION

The present invention relates to an inflatable side curtain air bag module assembly designed to provide occupant protection to vehicle passengers during a side impact (crash or collision) or rollover event. More particularly, the module is mounted proximate the vehicle roof rail and concealed by the headliner trim. Upon impact, the curtain (or air bag) deploys between the occupant and intruding object to protect the outboard front and rear occupants. The present invention defines one or more inflatable chambers within the air bag and insures that the front and the rear panels of the air bag that form these chambers remain spaced apart to provide added protection for the occupant while keeping the chamber volume at an acceptable level.

In order to control the inflated shape and volume of an air bag it has been proposed to directly sew the front and rear panels together. This type of construction also defines various chambers in the air bag (in which certain portions of the front and rear panels are spaced apart) but this construction also places other portions of the panels in direct contact, particularly at the separator sew lines. This reduced spacing reduces the "cushioned depth" between the occupant and a side of the vehicle. This is not the case with the present invention.

Accordingly the invention comprises: a side impact or rollover protection restraint system comprising: an air bag of sufficient length to extend from a first pillar to at least a second pillar of the vehicle, the air bag, upon inflation, is of sufficient height to extend from proximate a roof rail of the vehicle to a location generally adjacent the shoulder of a $50^{th}$ percentile sized seated occupant such that the inflated air bag will lie between the occupant and a side portion of the vehicle. The air bag includes a first and a second panel of material that are joined together to create at least one inflatable volume and a plurality of internal tether or separator means for forming corresponding bridges between predetermined regions of each of the first and second panel such that upon inflation of the air bag these regions are spaced from one another by an associated particular internal tether (separator panel).

It is an object of the present invention to provide an air bag or inflatable curtain to protect one or more vehicle occupants in a side impact and/or rollover crash event.

Many other objects and purposes of the invention will be clear from the following detailed description of the drawings.

BRIEF DESCRIPTION OF THE DRAWINGS

In the drawings:

FIG. 1c shows a cross-section through section 1c—1c of FIG. 1a.

FIG. 3 is a top view of an exemplary separator panel.

FIG. 8 is a cross-sectional view through section 8—8 of FIG. 7.

FIGS. 9a–9c and 10 show alternate separator panels.

DETAILED DESCRIPTION OF THE DRAWINGS

Figure 1A:
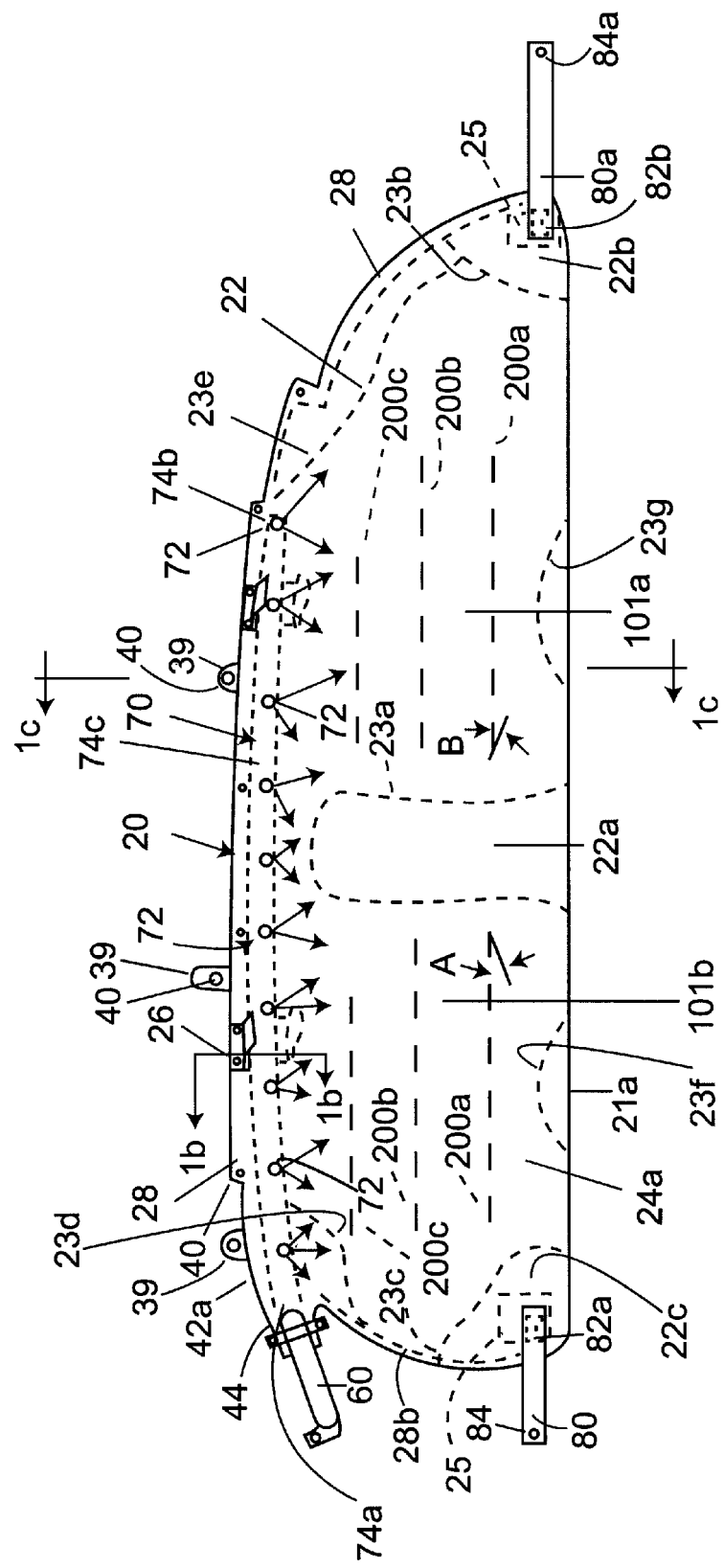
FIG. 1a illustrates a side plan view of an inflated air bag with horizontal chamber separators.

Reference is now made to FIGS. 1a–c, 2 and 6. FIG. 1a illustrates a side impact/rollover module generally shown as 20. The module 20 comprises an air bag 22 of sufficient length to extend generally across two or more pillars of the vehicle. As illustrated, air bag 22 extends from the vehicle's A-pillar (see FIGS. 2 and 6) 30 across the B-pillar 32 to the C-pillar 34. In other applications the air bag may extend only between two pillars or alternatively extend from the A-pillar to the D-pillar (as found in many mini vans, see FIG. 14). The air bag 22 is of sufficient height such that when deployed (see FIG. 6) the air bag 22 will lie between the roof rail 38 of the vehicle and the upper torso and/or shoulder of the outboard seated occupant ($50^{th}$ percentile), generally shown as 40a and 40b. When inflated the air bag will also lie against the vehicle's internal sides 36a and 36b.

Figure 4:
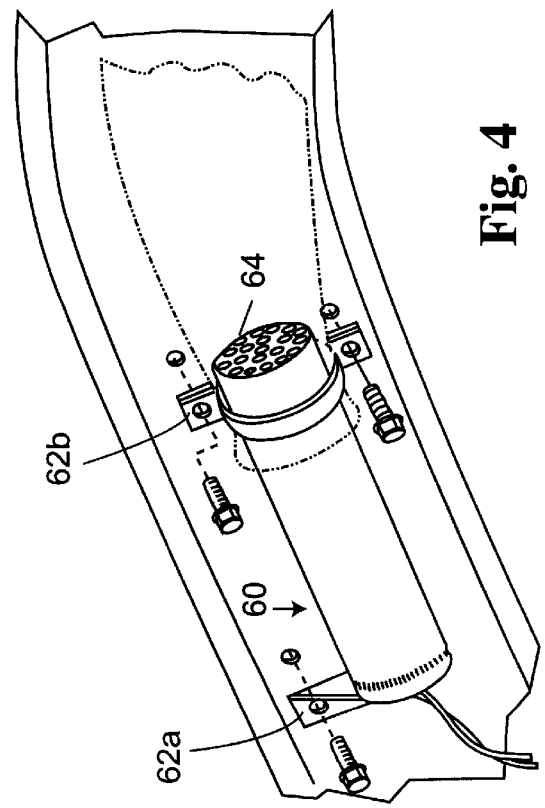
FIG. 4 is an isometric view of an axial flow air bag inflator.
Figure 5:
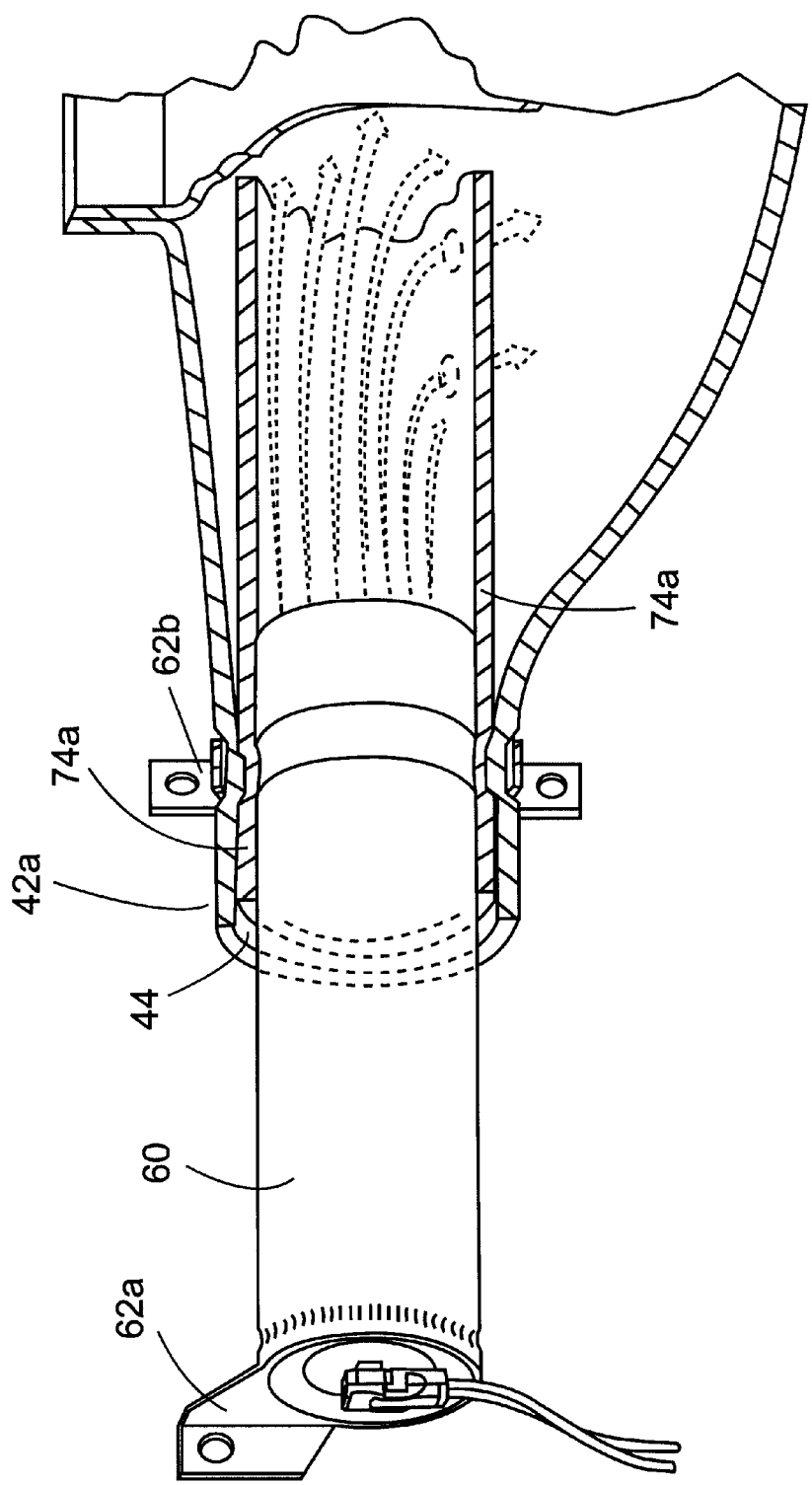
FIG. 5 illustrates the interconnection of the inflator with other components of the invention.

The air bag 22 comprises a single main panel 21 (see FIGS. 1 and 11) that is folded about its centerline 21a, the folded-over portions of the main panel 21 are referred to as a first or front 24a and a second or rear panel 24b. As can be appreciated, the air bag can be made of a plurality of separate panels of material that are joined together (along a centerline or otherwise) as opposed to using a folded-over main panel. In the preferred embodiment of the invention, the main panel is a woven material such as nylon that is coated on one side in a known manner to control air permeability. A low permeability, uncoated fabric may also be used. The air bag can also be formed of thermoplastic material that is welded or bonded together. With regard to the fabric, air bag material permeability and/or its coating are chosen to match the required time that the air bag should be inflated. As will be seen from the discussion below, the air bag 22 is formed by sewing the remaining three sides (after it is folded over centerline 21a) of the air bag together to form an inflatable cushion after various sets of separator panels 200a–c are attached to the panels 24a and 24b (see FIGS. 11 and 15). The top 26 of the air bag 22, as shown in FIG. 1a, is formed using a seam 28, which joins panels 24a and b together. The sides of the panels are joined by one or more seams 28a and 28b. Located above the seam 28 are a plurality of mounting features such as tabs 39 that may be formed integrally with the panels 24a and 24b. As shown, each tab 39 includes an opening 40. The openings can also be located directly in the selvage on the top side of the seam 28 (also shown in FIG. 1a); in this case the tab would not be necessary. The tabs 39 or just the openings 40 are useful to connect the air bag 22 to a roof rail 38 of the vehicle. A plurality of fasteners, not shown, are used to secure the top 26 of the air bag 22 to the roof rail 38. The air bag includes an inlet in the form of an opening 44 integrally formed by the panels 24a and 24b. In FIG. 1a the opening 44 is located toward the rear end 42a of air bag 22 but it can be located anywhere else in the air bag, preferably near the roof rail or a pillar to facilitate mounting. An air bag inflator 60 is inserted in opening 44 (see FIGS. 4 and 5). The inflator 60 includes a plurality of mounting brackets or flanges 62a and 62b to permit the inflator 60 to be mounted to an adjacent structural component such as the C-pillar of the vehicle or at a designated location along the roof rail. The inflator 60 may be a solid propellant, hybrid, augmented or liquid inflator of known variety, which upon activation produces or supplies pressurized inflation gas to the air bag 22. The inflator 60 includes a plurality of axially oriented output ports 64 (see FIG. 4) or a gas diverter housing (not shown) to direct the inflation gas into the air bag. Located within the top portion 26 of the air bag 22 is a flexible tube generally shown by numeral 70. The tube 70 has an elastomeric inner tube or core 71 with a reinforced outer sheath made of a braided or woven fabric 73, as shown in FIG. 1b. Alternatively, the tube can be made of metal, plastic, rubber or nylon. The tube 70 includes a plurality of openings 72 located thereacross. The tube 70 includes ends 74a and 74b. As can be seen in FIG. 5, end 74a is secured about the inflator 60, by bracket or clamp 62b, to permit the inflation gasses to flow directly therein. Opposite end 74b can be left open or closed or bonded shut as appropriate to properly distribute gas through the air bag. It should be appreciated that the inflator 60 can be mounted to end 74b, which would require that end 74a be similarly arranged. In addition, as can be appreciated, upon activation of the inflator 60, inflation gasses will be propelled down the tube 70. Because of the length of the tube 70, the pressure distribution of the inflation gasses will diminish in relation to the distance from inflator 60. Consequently, the openings 72 in the tube 70 may be non-uniformly distributed along the tube or may be of differing sizes such that the entire volume of the air bag 22 is inflated relatively simultaneously. For example, the distribution of openings 72 can be biased toward the closed end 74b of the tube 70, that is, the side of the air bag 22 farthest from the inflator 60. The tube 70 can extend across substantially the entire top of the air bag or terminate at the entrance of the front chamber 101a. Numeral 74c shows this termination. In this case the end of the tube 70 would be left open.

It is not necessary to inflate the air bag 22 to its maximum volume, as various regions of the inflated air bag are not located near a seated occupant. Consequently, various regions of the air bag 22 are closed off from receiving inflation gas. The size and placement of these regions will vary with the particular vehicle and seating arrangement. By reducing the inflated volume of the air bag, it is possible to use a smaller capacity inflator as less inflation gas is needed to inflate the air bag. In the air bag of FIG. 1a, the center of the air bag, such as 22a, which lies approximately near the location of the seat back 300, or alternatively near the B-pillar 32, is bonded or sewn shut so that it will not be inflated. The bonding or sew line is shown as 23a. As can be appreciated, if the air bag 22 were inflated in this location 22a, it would not provide any measurable degree of occupant protection in most impact conditions. The various corners of the air bag can usually be sewn shut. For example, the lower rear and lower front regions 22b and 22c can be bonded or sewn together (see sew lines 23b and 23c) such that they do not inflate. Various lower, upper and side portions of the air bag can be similarly restricted (see sew lines 23d–23g).

These lower regions of the air bag 22 may be reinforced with additional small patches 25 of material to reinforce the connection of an external tether 80. One end of the tether, such as 82a, is bonded or sewn to section 22c of the air bag while another end 84 of tether 80 is loosely or pivotally secured via a fastener (to a structural portion of the vehicle) which is received through opening 85. The sewn ends of the tether can be with the air bag or external thereto. Similarly, the forward portion 22b of the air bag 22 is secured to a second tether 80a. Similarly, end 84a of tether 80a is secured proximate the lower portion of the A-pillar 30 and moves downwardly upon deployment of the air bag 22.

Figure 1C:
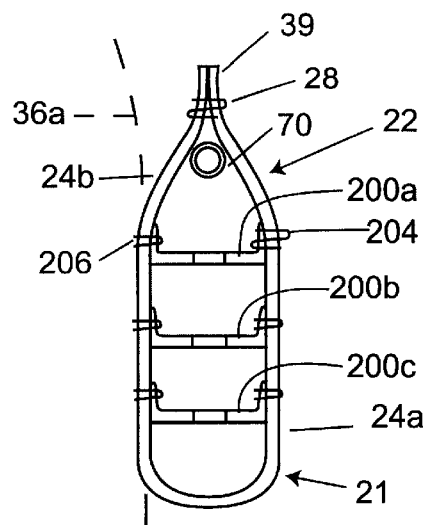
Figure 1E:
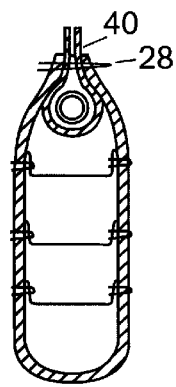
FIG. 1e shows an alternate tab construction for supporting a gas distribution tube.
Figure 1D:
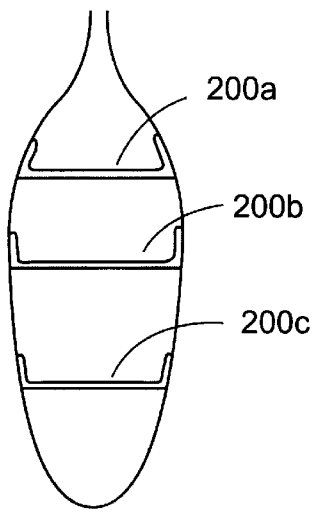
FIG. 1d shows another cross-section showing an alternate embodiment of the invention.
Figure 1B:
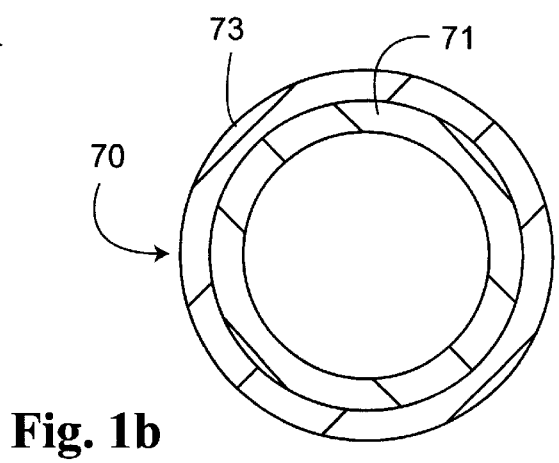
FIG. 1b is a cross-sectional view of a gas distribution tube.

Reference is again made to FIG. 1a as well as FIG. 1c. As can be seen, the air bag 22 is divided into two major inflatable regions, chambers or cushions 101a and 101b. Each of these cushions includes a plurality of separators (also called separator panels or bridges) 200a–c that join generally opposing regions of the front panel 24a and the rear panel 24b together. FIG. 1c shows the air bag 22 in its inflated state, lying against an interior side 36a of the vehicle. As can be seen, the separators 200a–c are of the same width, providing the inflatable chambers of the air bag with a generally rectangular cross section. Numeral 204 identifies the seams joining each of the separators 200a–c to panel 24a, while numeral 206 identifies the sewn seams joining the separators to panel 24b. FIG. 1d shows a further alternate of the invention. Tabs 39 are formed as thin strips (with holes 40 at its ends). These strips are formed into a U-shape to cradle the tube 70. The tabs, in the U-shape and with the tube within the "U" of the strap, are placed upon one of the panels of the air bag such as panel 24a. Panel 24b is overlaid on the tabs 39 and the panels 24a and 24 and the tabs are secured together at the upper seam 28. In this embodiment, the tabs function as a mounting means for the air bag and a support means for the tube 70. Further, the tabs 39 need not be integrated into the panels 24a and 24b but can be made from fabric straps. The separator panels are arranged to lie generally horizontally, but can be sewn at an angle, which is illustrated by letters A and B.

FIG. 3 is a plan view of an exemplary separator panel 200a. As can be seen, this separator or separator panel includes sides 210a and 210b, which are sewn to a corresponding air bag panel 24a or 24b. The ends 212a and 212b include slots 214. The interior end 216 of each slot or notch 214 is curved. The slot and curved internal profile provide for stress relief in the various seams 204 and 206 and prevent the separator panels 200a–c from separating from panels 24a and 24b. As can be appreciated, when the air bag 22 is inflated, the various panels 24a and b will tend to be forcefully pulled apart as illustrated by arrows 218 and resist further inflation of the cushions 101a,b. Each slot 214 permits the separated legs 220 of each end 212a and 212b to move outwardly, thereby relieving the stress that would otherwise be created at the sewn seams 204 and 206. The separator panels are made of woven material arranged at a bias (45°±5°) to the air bag panels 24a,b. The separator or separator panels such as 200a additionally include an opening or slot 222. The opening is preferably oval in shape. As can also be appreciated, the opening 222 and the two opposing slots 214 permit the inflation gas to be distributed quickly throughout the inflatable cushion portions 101a and 101b of the air bag.

As can be seen in FIG. 1a, it is not necessary that the length of any of the separators 200a–c be identical and are chosen to provide maximum protection for the occupant. For example, separator 200c within cushion portion 101a is shorter than its corresponding separator 200c in cushion portion 101a. Additionally, it may be desirable to tailor the width of any particular separator panel so that the inflated shape of the air bag, and in particular the cushions 101a and 101b, is controlled. Reference is briefly made to FIG. 1d, which shows the use of three separator panels 200a–200c, where each separator panel is of a different width.

Figure 7:
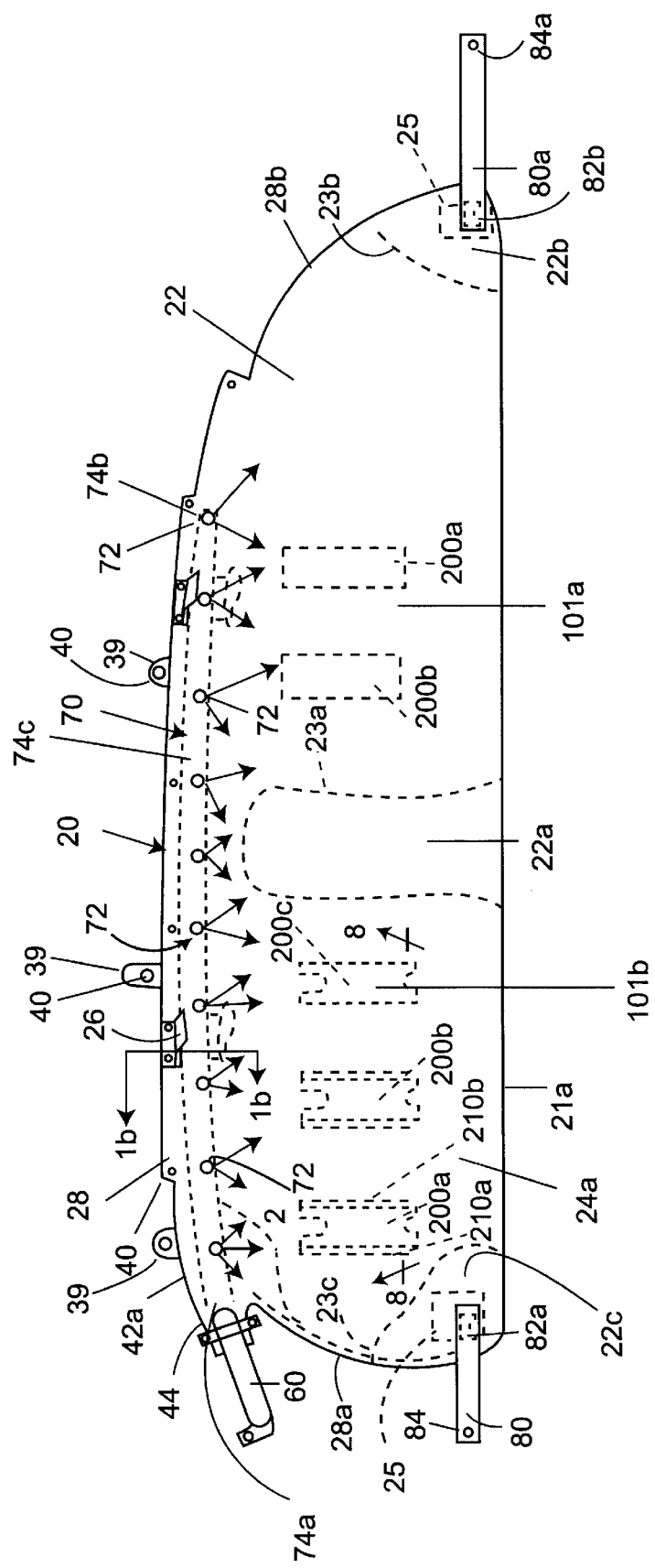
FIG. 7 shows an alternate embodiment of the invention with vertical separator panels.

Reference is made to FIG. 7. As can be seen the air bag 22 of FIG. 7 also includes the inflatable cushion portions 101a and 101b, however, the separator panels 200a, b and c are arranged relatively vertical. These panels can also be configured to lie at an angle relative to vertical rather than along the vertical. For generality the front cushion portion 101a is shown as including two separator panels 200a and 200b, while the rear cushion portion 101b includes three separator panels. The panels can be of varying sizes as shown. Each of the separator panels is also joined to a respective air bag panel 24a and b by a sew line or sewn seam 204 and 206 respectively. FIG. 7 also shows each separator panel laid flat between the air bag panels 24a and 24b and sewn thereto. As can be seen, the sewn seams 204 and 206 securing each separator panel to a respective panel are not aligned, but laterally spaced. FIG. 8 is a cross section through 8—8 of FIG. 7 and shows the relationship of the separator panels 200a, b and c when the air bag is inflated. The separator panels of FIG. 7 are generally rectangular in shape.

FIGS. 9a–c show plan views of exemplary separator panels 200a–c used in the air bag of FIG. 7. These various separator panels such as 200a include the slots 214 at their ends (the panel in FIG. 9b only has one slot). Each panel may optionally include opening 222 (shown in phantom line). The sides 210a and b may be parallel as illustrated in FIG. 3 or angled as shown in FIG. 9a, partially tapered as shown in FIGS. 9b and 9c or arcuately shaped as shown in FIG. 10.

Figure 11:
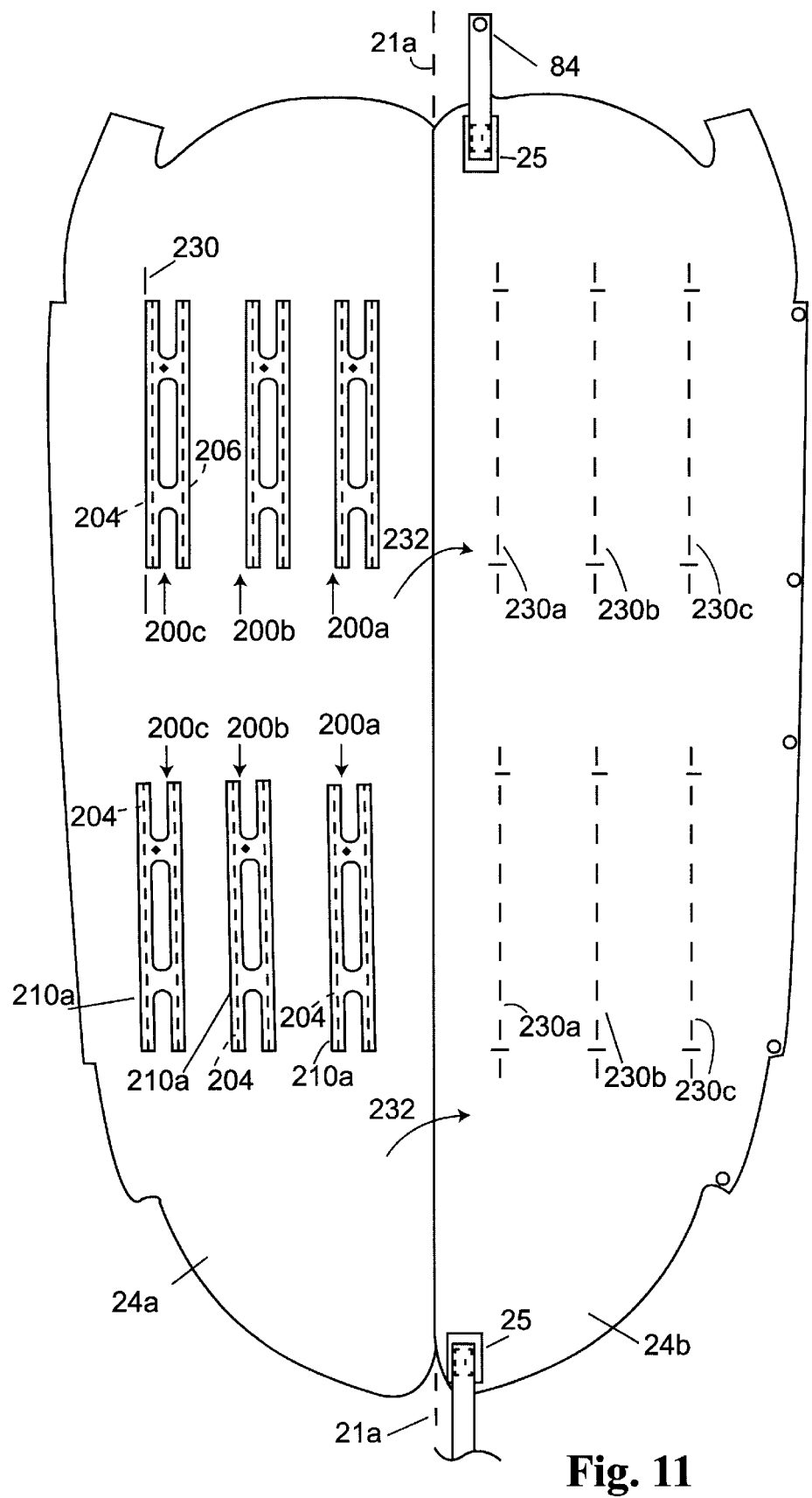
FIG. 11 is a plan view of the main panel of the air bag of FIG. 1.
Figure 12:
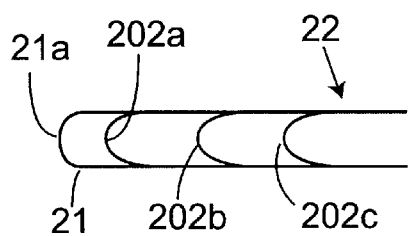
FIG. 12 is a cross-sectional view through a folded-over main panel and shows a plurality of separator panels also in a folded-over configuration.

FIG. 11 shows the main panel 21 for the air bag of FIG. 1, laid flat upon a work surface. The centerline 21a is also visible. Also illustrated in FIG. 11 are each of the two sets of three separator panels 200a, b and c for each of the cushion portions 101a and 101b. As can be appreciated from the description below, one of benefits of using the relatively horizontally oriented separator panels is the ease of construction. Each side 210a of each separator panel 200a–c is laid on one of the air bag panels, such as 24a, and placed in the desired location, which is identified by pre-printed markers or lines 230 and 230a–c. Each separator panel is then sewn along its side 210a to the air bag panel 24a. The sew lines 204 for each separator panel 200a–c are also shown. After the separator panels are secured along one of their sides to the main panel, they are then secured to the other side, such as panel 24b. Panel 24b includes markers or lines identified by numerals 230a–c showing the preferred location of each seam 206 (or side 210b), which secures the other side 210b of each separator panel to panel 24b of the air bag 22. As the main panel 21 is flexible, panel 24a can be folded and moved as the lower separators 200c are moved toward their preferred sewn location 230a on panel 24b. Arrows 232 are meant to show the movement of panel 24a and in particular separators 200a to the location denoted by the line 230a. With side 210b of each separator 200a moved in alignment or correspondence with line 230a, the lower separators 200a are sewn to panel 24b along side 210b. Subsequently, panel 24a and in particular the middle separator panels 200b are moved further over onto panel 24b such that sides 210b of these middle separator panels are in alignment with lines 230b, whereupon the middle separator panels are sewn to panel 24b. The above process is continued until side 210b of each of the upper separator panels 200c is sewn along lines 230c. Upon sewing the upper separator panels 200c to panel 24b of air bag 24, panel 24a is positioned on top of panel 24b. With the panels 24a and b in this orientation, the top and sides of the air bag are secured together along peripheral seams 28, 28a and 28b. In addition, the non-inflated regions 22a, b, c, etc. are created by a plurality of additional sewn seams to achieve the configuration as shown in FIG. 1a. The tethers 80 and 80a can be sewn to the main panel before it is folded over or sewn to the air bag after it is folded over and, if needed, and as mentioned above, additional patches of air bag material are placed in the vicinity of the sewing connection of the tethers 80a and 80b to further reinforce the air bag. In one construction, the tube 70 is inserted through opening 44 in the air bag and positioned against seam 28 (at the top of the bag) and the inflator 60 attached thereto. As mentioned above in relation to FIG. 1e, the tube 70 and the tabs 39 can be placed on panel 24a of the main panel while it is open, tacked in place and panel 24b sewn to panel 24a.

Subsequently, the air bag is folded into a long, compact, cylindrical configuration, see FIGS. 2 and 13. An additional benefit of the horizontal tethers is that the various folds in the air bag can be arranged such that the various seams 204 and 206 of each of these separator panels do not lie on top of each other, thereby permitting the air bag to be folded in a compact configuration (as shown in FIG. 13).

Figure 14:
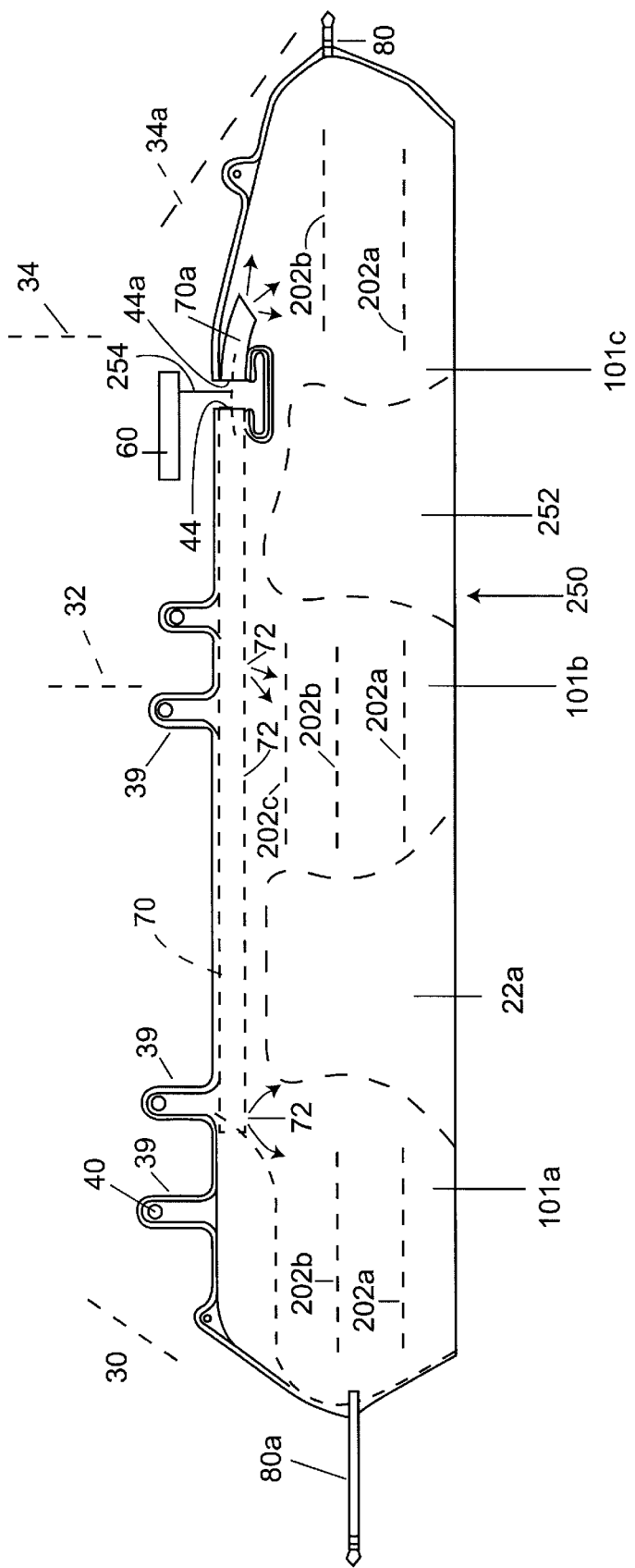
FIG. 14 is a plan view of an alternative side impact rollover cushion air bag.

Reference is briefly made to FIG. 14, which illustrates an alternate embodiment of the air bag. This air bag is adapted to extend from the A to the D pillar 34a so as to provide protection for occupants in the front, middle and rear seats of a minivan. This air bag 250 is substantially similar to air bag 22 of FIG. 1a in relationship to the inflatable cushions 101a and b and the various separator panels 200a–c. Additionally, air bag 250 extends rearward of cushion portion 101b and includes a second non-inflatable area 252 followed by an inflatable cushion portion 101c having two separator panels 200a and 200b. Additionally, the opening 44, which was placed in the rear of air bag 22, is configured somewhat differently in air bag 250. As can be seen, air bag 250 is configured to include a second opening 44a positioned adjacent opening 44. The inflator 60 is communicated to both openings 44 and 44a through a hollow, T connection or fitting. The above-mentioned flexible hose 70 extends from opening 44 toward the front of the panel and terminates at the rear of cushion portion 101a. It is not necessary to use a tube such as 70a to distribute inflation gas into rearmost cushion 101c. For the purpose of illustration, tube 70a has been shown.

Figure 2:
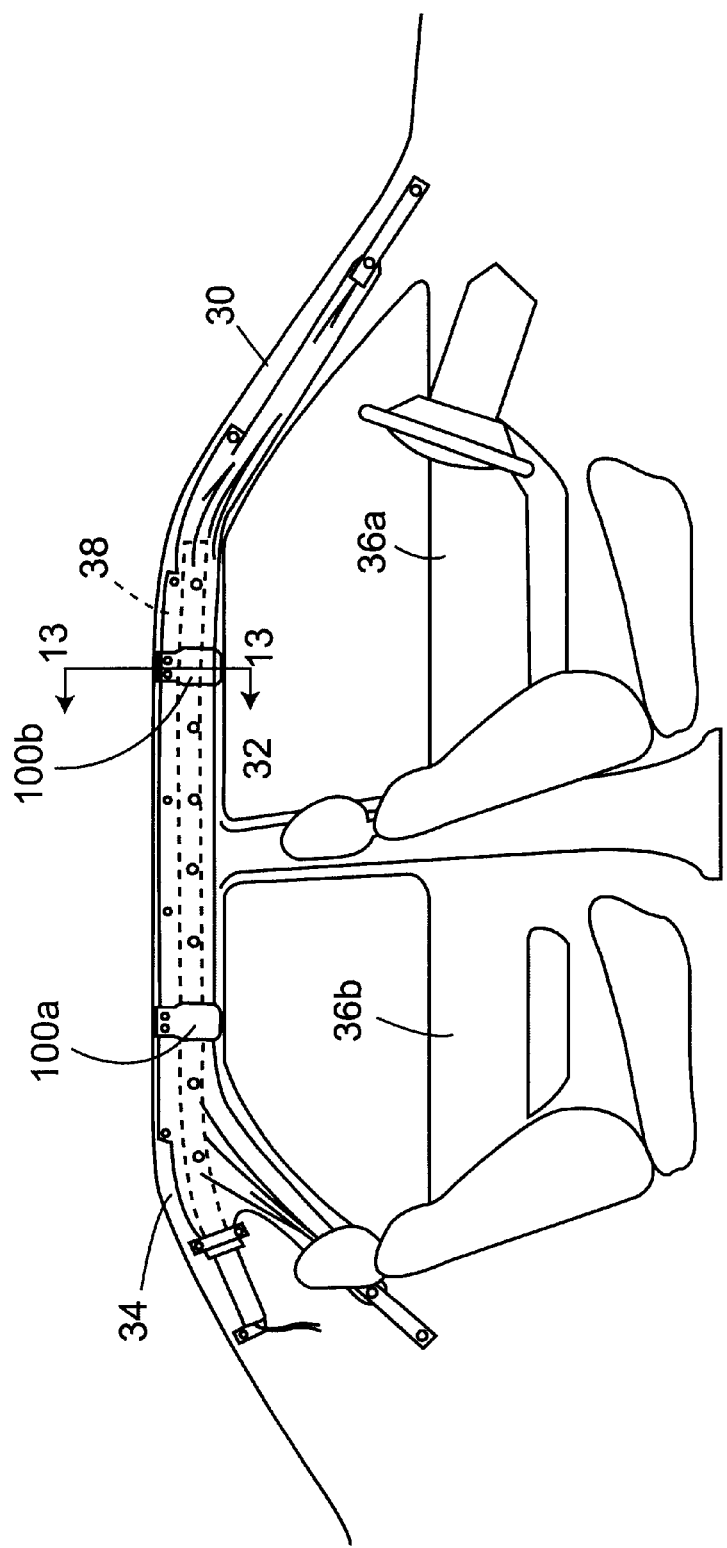
FIG. 2 is a left-hand plan view of the interior of a passenger compartment showing the major components of the present invention.
Figure 13:
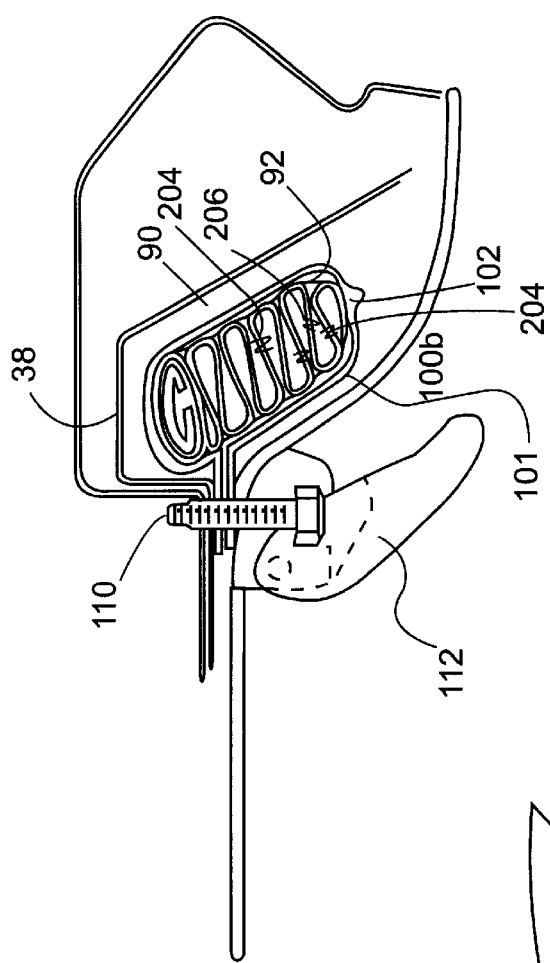
FIG. 13 shows a folded air bag mounted near a roof rail.
Figure 6:
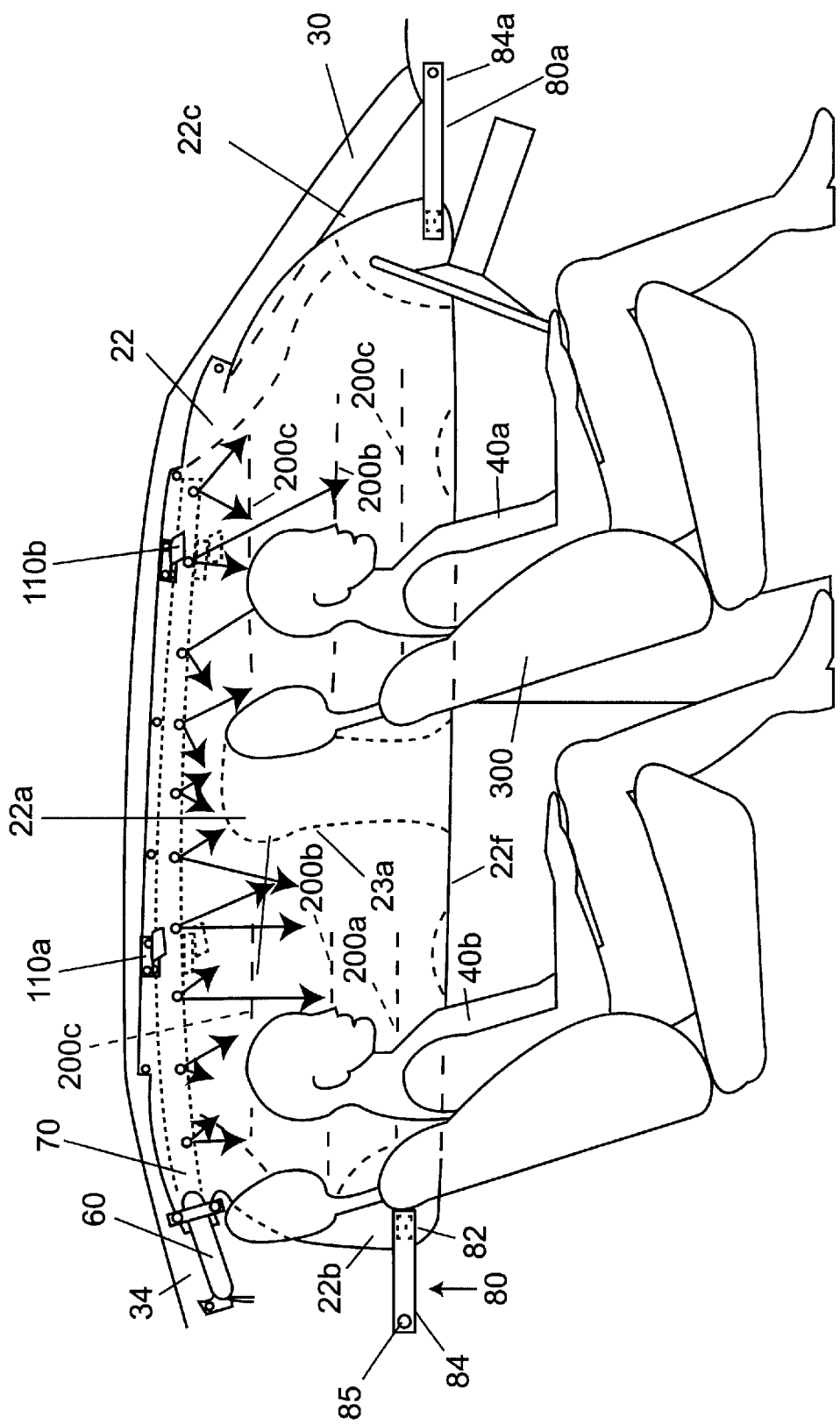
FIG. 6 shows a side curtain or air bag in its deployed state protecting occupants within the passenger compartment.

To fold the air bag into the configuration of FIG. 2, the lower edge of the air bag 22 is folded upwardly such as into an accordion or other pleat configuration 90 to achieve the configuration generally shown in FIG. 13. In this configuration, the air bag 22 of FIG. 1 will essentially be formed into a long, cylindrical-like configuration. To keep the air bag in this rolled configuration, the air bag is enveloped in a tearable cover 92 such as sewn fabric, polyurethane with tear seam or snap-together (and openable) semi-hard plastic cover. The folded, enveloped air bag 22 is then secured to the roof rail 38 using a plurality of retainer clips, such as 100a and 100b (see FIG. 2). As illustrated in FIG. 13, one of the retainer clips, such as 100b, includes a pre-stressed tear or snap-together region 102 to permit each clip to open (as illustrated in FIG. 6) upon inflation of the air bag 22. The retainer clips 100a and 100b can be secured by fasteners 110. FIG. 13 shows one such fastener 110 securing clip 100b to the roof rail. The fastener 110 can also be used to secure a hand grasp 112, which is often located adjacent the roof rail.

Figure 15:
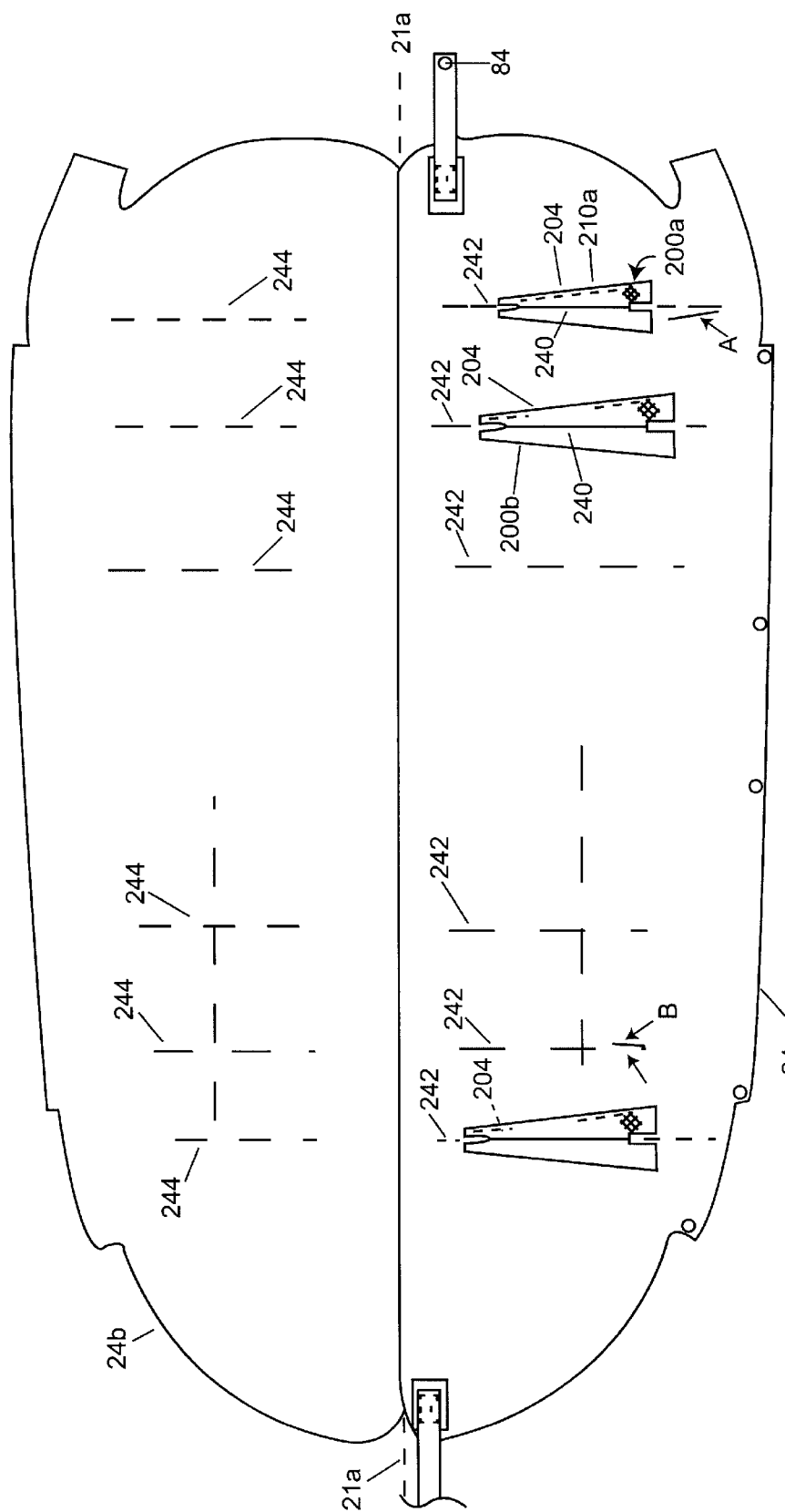
FIG. 15 shows the main panel of the air bag of FIG. 7 laid open with various separator panels being sewn thereto.

The following describes the construction of the air bag 22 with relatively vertically arranged separators shown in FIG. 7. Reference is first made to FIG. 9a, which illustrates a typical separator used in this air bag. Each separator has printed thereon a reference line 240 that extends through the center of the separator panel, such as 200a. FIG. 15 shows a main panel 21 laid open on work or sewing table with panels 24a and 24b laid flat relative to the centerline 21a. Prior to attaching any of the separator panels, the air bag panels 24a and 24b are imprinted with a plurality of reference lines 242 and 244, which identify the location of the center of each separator panel 200a–200c. A first separator panel is placed on one of the air bag panels, such as 24a, with its center reference line 240 aligned with its corresponding reference line 242. Having aligned the two reference lines 242 and 240 (on the separator panel), the operator ensures that the separator panel is laid flat and then sews the separator panel along a first sew line 204, which extends along side 210a of the separator panel. Thereafter, a second separator panel is positioned upon its reference line and sewn to the air bag panel 24a. This process is continued (from left to right or right to left) until each separator panel is sewn to the air bag panel along only one side of the separator panel. Thereafter, panel 24b is folded over the centerline of the main panel 21 and registered and aligned with panel 24a. The folded-over panels 24a,b are flipped over such that panel 24b lies against the work surface.

Figure 16:
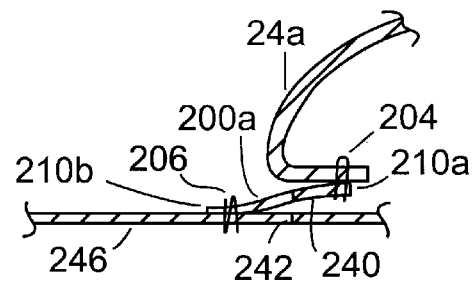
FIG. 16 shows how a separator panel is secured to the main panel of FIG. 15.

Reference is made to FIG. 16, which illustrates the seam 204 used to join one of the separator panels to air bag panel 24a. The separator panel 200a and the air bag panel 24 are shown lifted from panel 24b for the purpose of illustration, it being recognized that these panels will lie flat one on the other. Prior to sewing side 210d of the first separator panel to air bag panel 24b, the center reference line 240 is aligned to the reference line 244 previously imprinted on panel 24d. To facilitate this alignment, the operator will roll over a portion of the air bag panel 24a, exposing the separator panel 200a. Thereafter, the operator ensures that panel 200a lies flat on air bag panel 24 and sews the panels together along seam 206.

Figure 17:
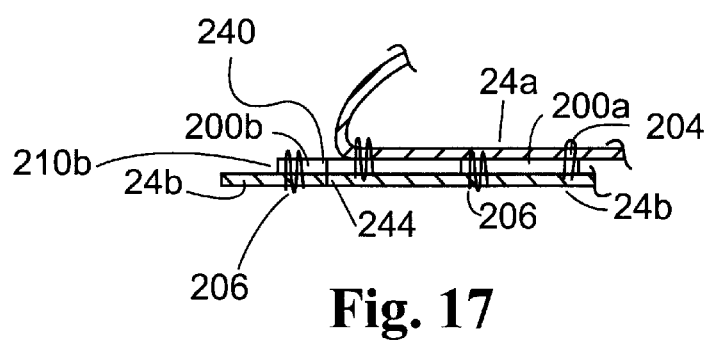
FIG. 17 shows another step in the construction of the air bag of FIG. 15.

Reference is now made to FIG. 17, which shows separator panel 200a secured to air bag panels 24a and 24b. Using the method as described in FIG. 16, the operator will repeat the steps described above to secure separator panel 200b to panel 24b. As before, the reference line 240 of this separator panel is aligned to reference line 244 in air bag panel 24. A portion of panel 24a is folded over to expose side 210b of separator panel 200b. The operator ensures that separator panel 200b lies flat against panel 24b with their reference lines aligned and sews the panels together along seam 206. This process is continued until each of the separator panels is secured. Thereafter, the perimetal seams are placed in the air bag, the external tethers attached and the various non-inflation zones established, thereby completing the construction of this air bag.

Many changes and modifications in the above-described embodiment of the invention can, of course, be carried out without departing from the scope thereof. Accordingly, that scope is intended to be limited only by the scope of the appended claims.

What is claimed is:

1. A side impact or rollover protection restraint system (20) comprising:

an air bag of sufficient length to extend from a first pillar (30) to at least a second pillar (34) of the vehicle, the air bag (22), upon inflation, is of sufficient height to extend from proximate a roof rail (38) of a vehicle to a location generally adjacent the shoulder of a 50th percentile sized seated occupant such that the inflated air bag will lie between the occupant and a side portion of the vehicle;

the air bag including a first and a second panel of material that are joined together to create at least one inflatable volume (101a,c) and a plurality of internal tethers or separator means for forming corresponding bridges between predetermined regions of each of the first and second panel such that upon inflation of the air bag these regions are spaced from one another by at least one internal tether, wherein the air bag includes more than one inflatable volume, wherein each volume includes corresponding internal tethers or separator means.

2. The system as defined in claim 1 wherein at least one internal tether or separator means includes an opening therein to allow inflation gas to flow thereacross.

3. The system as defined in claim 2 wherein the opening is generally oval in shape.

4. The system as defined in claim 1 wherein opposing ends of the bridge are secured to a corresponding first and second panel along a corresponding sewn seam or sew line.

5. The system as defined in claim 4 wherein the sew line of one end of the bridge in the first panel is generally in alignment with the sew line of the other end of the bridge in the second panel.

6. The system as defined in claim 4 wherein the sew line of one end of the bridge in the first panel is spaced from the sew line of the other end of the bridge in the second panel.

7. A side impact or rollover protection restraint system (20) comprising:

an air bag of sufficient length to extend from a first pillar (30) to at least a second pillar (34) of the vehicle, the air bag (22), upon inflation, is of sufficient height to extend from proximate a roof rail (38) of a vehicle to a location generally adjacent the shoulder of a 50th percentile sized seated occupant such that the inflated air bag will lie between the occupant and a side portion of the vehicle;

the air bag including a first and a second panel of material that are joined together to create a plurality of inflatable volumes (101a,c) and a plurality of internal tethers or separator means, for each volume, for forming corresponding bridges between predetermined regions of each of the first and second panel such that upon inflation of the air bag these regions are spaced from one another by at least one internal tether;

wherein each internal tether or separator means includes opposing sides, and wherein the opposing sides are one of: straight and angled relative to one another, and arcuate.

8. A side impact or rollover protection restraint system (20) comprising:

an air bag of sufficient length to extend from a first pillar (30) to at least a second pillar (34) of the vehicle, the air bag (22), upon inflation, is of sufficient height to extend from proximate a roof rail (38) of a vehicle to a location generally adjacent the shoulder of a 50th percentile sized seated occupant such that the inflated air bag will lie between the occupant and a side portion of the vehicle;

the air bag including a first and a second panel of material that are joined together to create a plurality of inflatable volumes (101a,c) and a plurality of internal tethers or separator means, for each volumes for forming corresponding bridges between predetermined regions of each of the first and second panel such that upon inflation of the air bag these regions are spaced from one another by at least one internal tether;

wherein each inflatable portion of the air bag includes at least two rows of tethers.

9. A side impact or rollover protection restraint system (20) comprising:

an air bag of sufficient length to extend from a first pillar (30) to at least a second pillar (34) of the vehicle, the air bag (22), upon inflation, is of sufficient height to extend from proximate a roof rail (38) of a vehicle to a location generally adjacent the shoulder of a 50th percentile sized seated occupant such that the inflated air bag will lie between the occupant and a side portion of the vehicle;

the air bag including a first and a second panel of material that are joined together to create a plurality of inflatable volumes (101a,c) and a plurality of internal tether or separator means, for each volume, for forming corresponding bridges between predetermined regions of each of the first and second panel such that upon inflation of the air bag these regions are spaced from one another by at least one internal tether;

wherein each tether includes opposing long sides and opposing ends, wherein each tether is secured to a corresponding first and second panel along a respective side of the tether.

10. The system as defined in claim 9 wherein each end of a tether includes a stress reducing feature.

11. The system as defined in claim 9 wherein the tether includes an opening spaced from the sides and ends.

12. The system as defined in claim 9 wherein one end is wider than its opposing end.

13. The system as defined in claim 9 wherein the length of at least one tether differs from the length of an adjacent tether.

14. A side impact or rollover protection restraint system (20) comprising.

an air bag of sufficient length to extend from a first (30) pillar to at least a second pillar (34) of the vehicle, the air bag (22), upon inflation, is of sufficient height to extend from proximate a roof rail (38) of a vehicle to a location generally adjacent the shoulder of a 50th percentile sized seated occupant such that the inflated air bag will lie between the occupant and a side portion of the vehicle;

the air bag including a first and a second panel of material that are joined together to create a plurality of inflatable volumes (101a,c) and a plurality of internal tether or separator means, for each volume, for forming corresponding bridges between predetermined regions of each of the first and second panel such that upon inflation of the air bag these regions are spaced from one another by at least one internal tether;

the tether are in rows of two or more.

15. A side impact or rollover protection restraint system (20) comprising:

an air bag of sufficient length to extend from an A-pillar (30) to at least a D-pillar (34) of the vehicle, the air bag (22), upon inflation, is of sufficient height to extend from proximate a roof rail (38) of a vehicle to a location generally adjacent the shoulder of a seated occupant such that the inflated air bag will lie between the occupant and a side portion of the vehicle, the air bag including uninflated regions in the vicinity of a B-pillar and a C-pillar;

the air bag including a first and a second panel of material that are joined together to create inflatable regions and a plurality of rows of internal tethers for forming corresponding bridges between the first and second panel of each particular region such that upon inflation of the air bag these regions are spaced from one another by at least one internal tether, wherein the regions are proximate the A-pillar, between the B and the C-pillars and between the C and D-pillars.

* * * * *